United States Patent [19]

Walsh et al.

[11] Patent Number: 4,951,467
[45] Date of Patent: Aug. 28, 1990

[54] AUTOMATIC TRANSMISSION TORQUE CONVERTER FRONT COVER

[75] Inventors: Michael J. Walsh, Oak Park; Jesse S. Soper, Roseville, both of Mich.

[73] Assignee: Chrysler Corporation, Highland Park, Mich.

[21] Appl. No.: 351,493

[22] Filed: May 11, 1989

[51] Int. Cl.[5] ............................................. F16D 33/00
[52] U.S. Cl. ..................... 60/361; 74/606 R; 192/3.28
[58] Field of Search ............... 60/361, 330; 192/3.28; 74/606 R

[56] References Cited

U.S. PATENT DOCUMENTS

| | | | |
|---|---|---|---|
| 3,307,430 | 3/1967 | Bauder | 74/763 |
| 3,665,707 | 5/1972 | Koivunen | 60/54 |
| 4,423,803 | 1/1984 | Malloy | 192/3.29 |
| 4,437,551 | 3/1984 | Gimmler et al. | 192/3.28 |
| 4,445,599 | 5/1984 | Bopp | 192/3.29 |
| 4,466,518 | 8/1984 | Mueller | 192/3.29 |
| 4,469,206 | 9/1984 | Mutomura et al. | 192/3.28 |
| 4,627,523 | 12/1986 | Light | 192/58 B |
| 4,761,952 | 8/1988 | Holler | 60/330 |
| 4,768,637 | 9/1988 | Bopp et al. | 192/106.1 |
| 4,783,960 | 11/1988 | Kubo et al. | 60/338 |

*Primary Examiner*—William E. Wayner
*Attorney, Agent, or Firm*—Edward P. Barthel

[57] ABSTRACT

A torque converter has a front cover having grooves or depressions integrally formed therein which operate to increase oil flow in the torque converter and hence lubrication and cooling thereof.

17 Claims, 3 Drawing Sheets

AUTOMATIC TRANSMISSION TORQUE CONVERTER FRONT COVER

BACKGROUND AND SUMMARY OF THE INVENTION

The present invention relates to automatic transmissions and, more particularly, to torque converter housing covers providing increased fluid flow within the torque converter.

In automatic transmissions, especially in the torque converters, it is desirable to maintain maximum fluid or oil movement through the torque converter. Maximum fluid flow in the torque converter increases lubrication and cooling of the turbine, stator and impeller blades within the torque converter. Thus, the increased fluid flow enhances the overall performance of the torque converter and the automatic transmission. Generally speaking, a torque converter includes a transmission input shaft, turbine, stator, impeller, piston, friction material, stator overrunning clutch and front cover. Ordinarily, oil flows through the input shaft onto the front cover. The oil flows radially and axially along the front cover passed the piston and friction material to lubricate and cool the turbine, stator and impeller.

It is believed that a centrifugal head exists between the turbine and piston assembly in the torque converter. It is further believed that this centrifugal pressure head is caused by the internal leakage at the area of the running clearance between the impeller outlet and turbine inlet. The centrifugal head is believed to cause the piston assembly to move forward toward the front cover housing of the torque converter. As the piston assembly moves forward, it acts to pinch off the oil flow at the friction material area thus reducing and starving the oil flow within the torque converter.

An existing front cover housing as explained above is illustrated in FIG. 1. Generally, the torque converter cover 1 includes a circular base 2 and a peripheral skirt 3 extending transverse to the base. Generally, the base 2 includes a cup 4 at its center. The interior surface 5 of the base 2 is generally continuous having several ribs at radial positions outward from the cup 4 to the skirt 3 to provide rigidity. The cover 1 is generally secured with the impeller housing to provide the front cover of the torque converter.

Accordingly, in order to maintain a maximum oil flow and the desirable effects thereof, it is desirable to counteract the centrifugal head which tends to restrict maximum flow. As costs are always an important consideration, it is desirable to provide means for achieving this goal which are relatively economical, as well as being highly reliable in operation. Also, the means would preferably be adapted to be combined with torque converters without substantial alteration of the torque converter.

Accordingly, the present invention provides such a device which acts to substantially increase fluid flow in the torque converter. The present invention provides means which act as a second impeller to counteract the centrifugal forces generated so as to thereby increase fluid flow within the torque converter housing. By increasing the fluid flow, the present invention also increases lubrication and cooling of the torque converter thereby aiding in improved life expectancy and reliability.

From the below detailed description taken in conjunction with the accompanying drawings and claims, other objects and advantages of the present invention will become apparent to those skilled in the art.

DETAILED DESCRIPTION OF THE DRAWINGS

DETAILED DESCRIPTION OF THE PREFERRED EMBODIMENT

Figure 2:
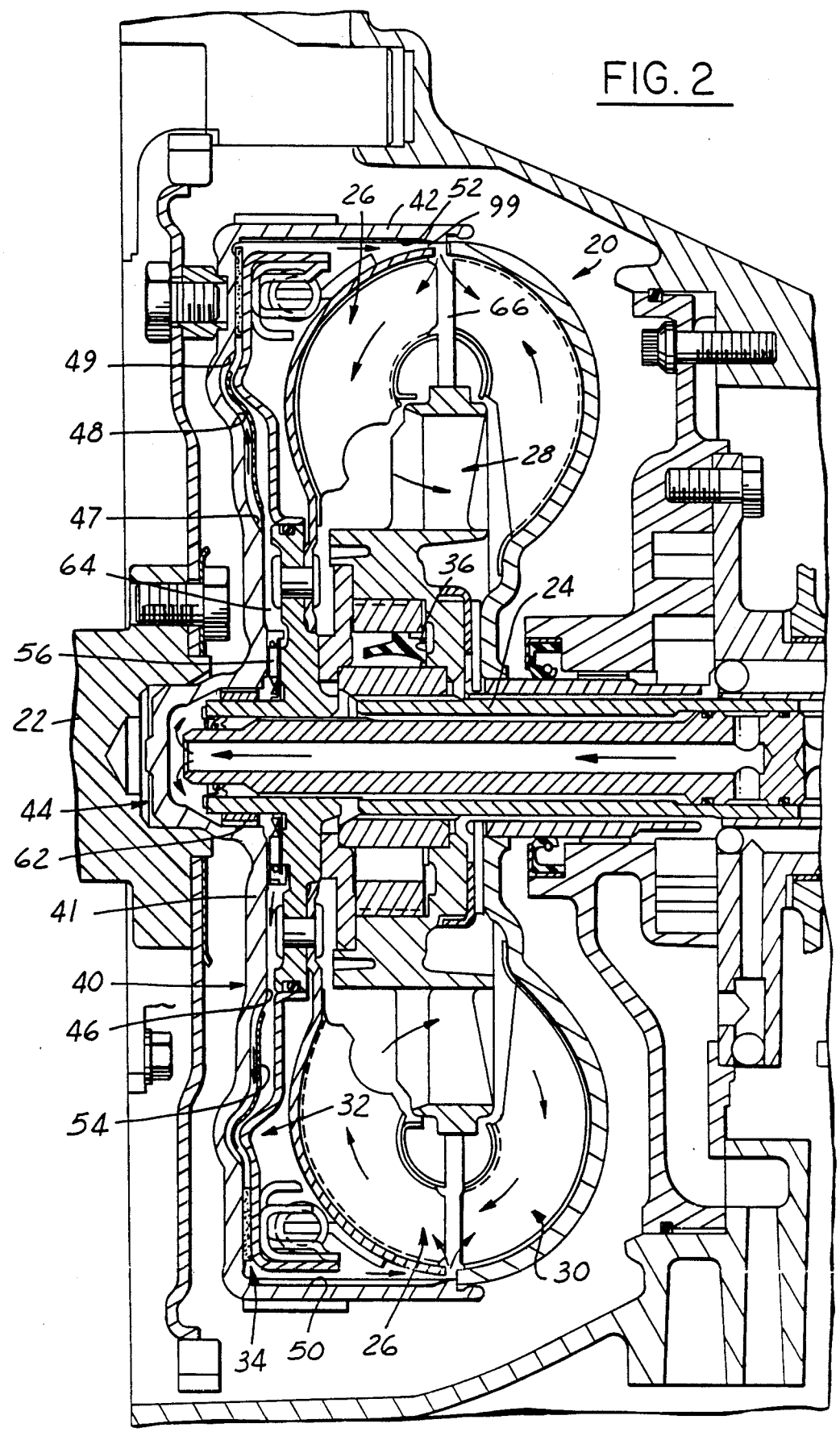
FIG. 2 is a partial cross-section view of a transmission including a torque converter the section being taken along a vertical plane passes through the axis of rotation.

Turning to the figures, particularly FIG. 2, a portion of an automatic transmission is shown incorporating a torque converter 20 having a cover in accordance with the present invention. Generally speaking, the engine crankshaft 22 is coupled with the torque converter 20 to transmit the engine rotational drive into rotational driving forces to the transmission via the transmission input shaft 24. The torque converter 20 ordinarily includes a turbine 26, stator 28, impeller 30, piston 32, friction material 34, stator overrunning clutch 36 and front cover 40.

Figure 3:
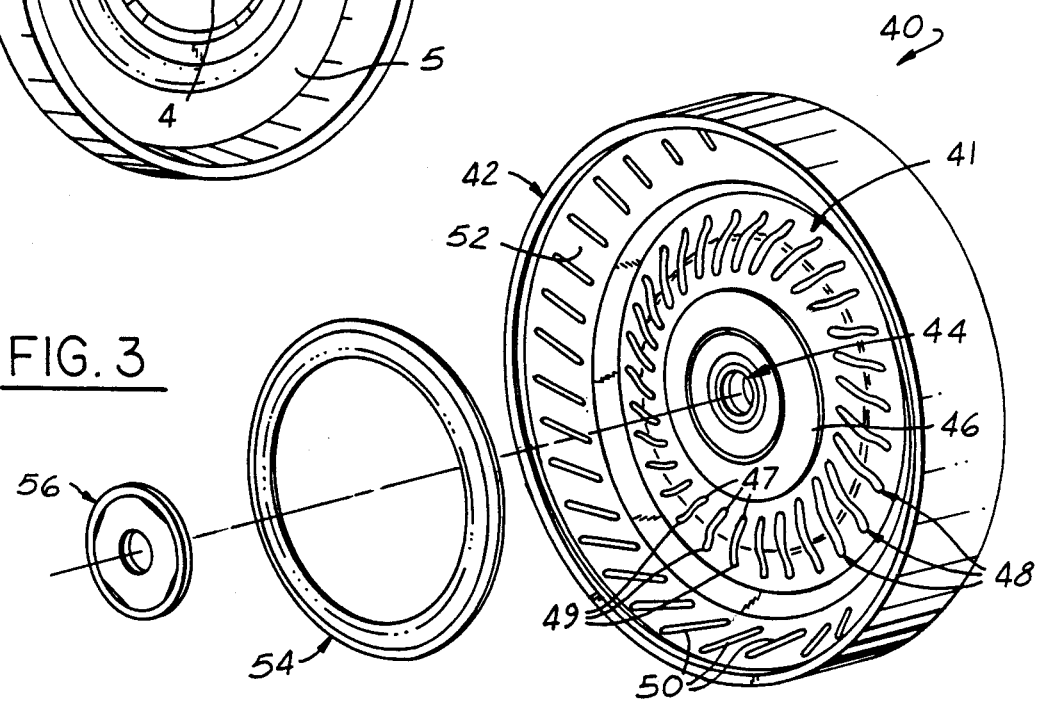
FIG. 3 is an exploded perspective view of a torque converter front cover housing in accordance with the present invention.

Turning to FIG. 3, an exploded perspective view of the front cover 40 is illustrated. The front cover 40 generally includes a circular base 41 having a peripheral skirt or wall 42 extending substantially transverse from the base 41. The base 41 generally includes a cup portion 44 at its center and a contoured continuous interior surface 46. The curves of the interior surface 46 are best illustrated in cross-section in FIG. 2. The interior surface 46 includes one or more grooves or slots 48 formed in the interior surface 46 of the base 41. Also, one or more slots or grooves 50 may be formed in the interior surface 52 of the skirt 42.

Figure 4:
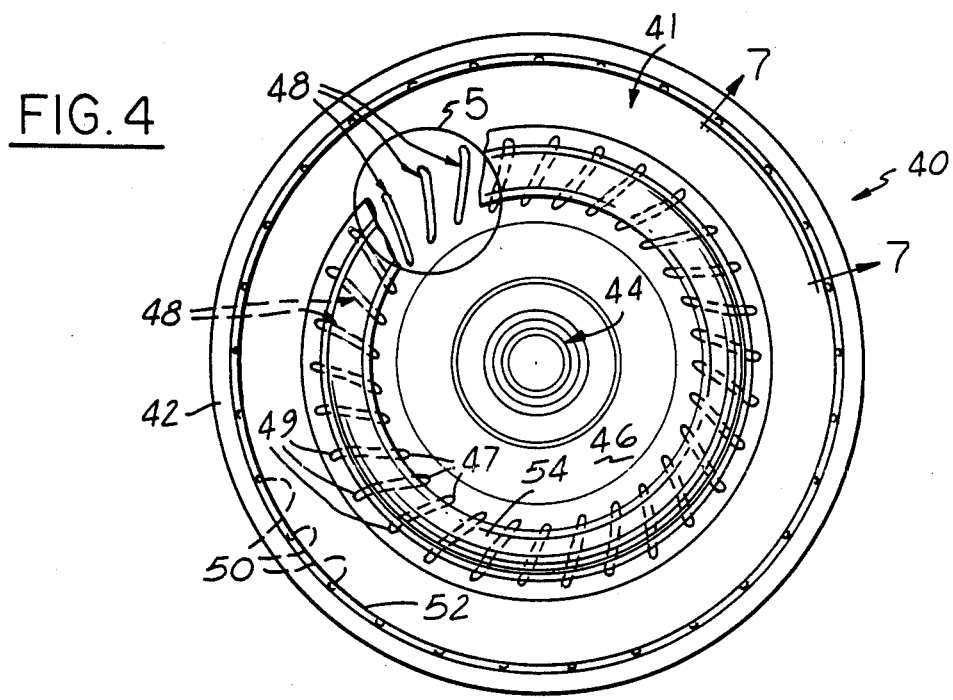
FIG. 4 is a view of the components shown in FIG. 3 illustrated in assembled relationship.

In use, an annular ring shaped cover 54 and existing bearing 56 are positioned against the slots 48 and interior surface 46, respectively, to enhance the fluid flow through the slots 48 as will be explained herein. The annular cover 54 has a diameter and a center opening of a diameter such that the cover 54 conceals the center portion of the slots 48 leaving the axially inner and outer ends 47 and 49 thereof exposed as illustrated in FIG. 4. The annular ring 54 generally has a curved cross-section to generally correspond to the contour of the interior surface 46 of the base 41 as illustrated in FIG. 2. Thus, in use the annular ring 54 seats against base 41 and in which space slightly from the slots 48.

The slots 48 are formed in the base 41, by machining, stamping, rolling, hobbing or the like. The slots 48 are arranged in a circumferentially spaced circular array and are elongated in a direction extending at desired angles to a true radius along the contoured interior surface 46 of the base 41. The angular positioning of the slots 48 along the contoured interior surface 46 is such that the lines 51 bisecting the slots 48 are tangent to the bearing 56 and such that a constant angle is formed between adjacent bisecting line 51 of adjacent slots as shown in FIG. 5.

Figure 5:
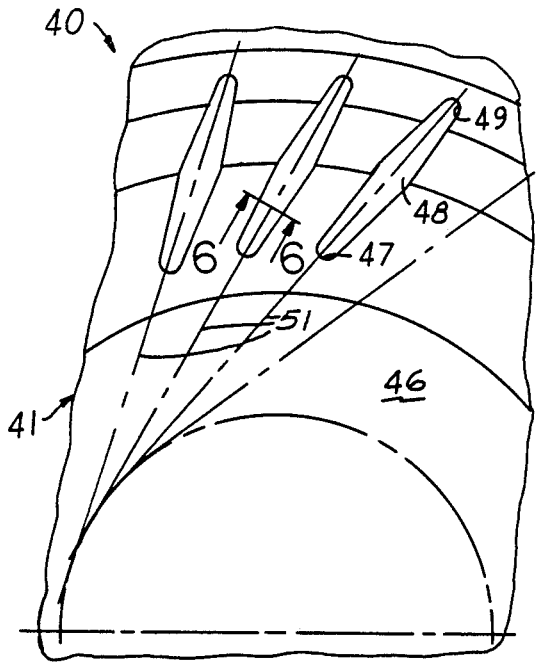
FIG. 5 is an enlarged detailed view of the portion of FIG. 4 enclosed within circle 5.
Figure 6:
FIG. 6 is a cross-section view of a vane shown in FIG. 5 the section being taken along line 6—6 thereof.

The slots 48 may have various geometric configurations in a plan view, however, generally the body of the slot is wider than the ends 47 and 49 as illustrated in FIG. 5. The lateral cross-section shape of the slots is generally rectangular as illustrated in FIG. 6. The dimensioning an positioning of the slots 48 is to provide maximum flow of oil feeding the torque converter. This is accomplished by oil entering the slots 48 increasing the momentum of the oil as it is moves across the base 41.

Figure 7:
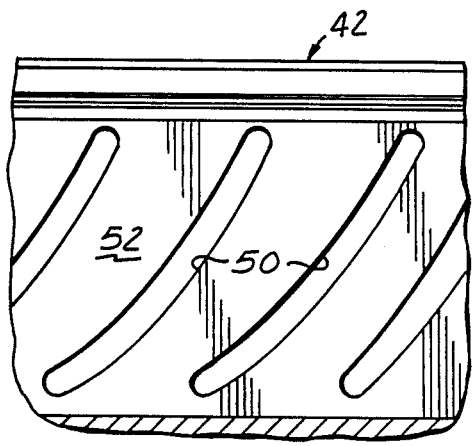
FIG. 7 is a section view of a portion of FIG. 4 the section being taken along line 7—7 thereof.

The slots 50 are generally arcuately shaped and positioned in substantially equally spaced relationship around the skirt 42. Furthermore, the slots 50 act as an Archimedes screw to force the fluid along the skirt 42. The slots 50 may be of other varying geometries and may be machined, stamped or otherwise formed into the interior surface 52 of the skirt 42 as illustrated in FIG. 7. The oil is held into the slots 50 by the radial centripetal force of the torque converter. It is believed that the radial centripetal pressure ($P_R$) component is defined by the following equation:

$$P_R = \frac{\rho \omega^2 R^2}{3}$$

$\rho$ = density of the oil (g/cm$^3$)
$\omega$ = angular velocity (RAD/s)
R = Radius of the torque converter cover (cm)
As shown, the slots 50 are extended diagonally across the width of skirt 42 at predetermined angles with respect thereto. Preferably, the predetermined angles range from about 125 to about 145 degrees for providing maximum fluid flow along the skirt 42.

As shown in FIG. 2, oil or the like is passed through the center of the transmission input shaft 12 toward the cover cup portion 44. At the cup portion 44, the oil is thrown outwardly as indicated by the arrows. The oil flow passes by the bushing 62, due to the clearances between the cup portion 44 and the bushing 62 and continues to pass by the bearing 56. The oil flow passes into an oil galley 64 between the bearing 56 and slots 48. From the oil galley 64 the oil passes in the slots 48 on the interior surface of the cover 40. The oil flow passes by the slots 48 beneath the cover 54 toward the skirt 42. The fluid picks up momentum as it passes through slots 48 underneath the cover 54 and is slung out of the ends 49 of the slots 48 against the piston 32 and passed the friction material 34 towards the skirt 42. The front cover 40 with the slots 48 in effect becomes a secondary impeller or centrifugal pump to counteract the centrifugal head of the turbine 26 and piston 32. The axial component of centrifugal force ($F_{ax}$) is believed to be defined by the following equation:

$$F_{ax} = \frac{\rho \pi \omega^2 R^4}{6}$$

$\rho$ = Density of the oil (g/cm$^3$)
$\omega$ = Angular velocity (RAD/s)
R = Radius of the torque converter cover (cm)
The centrifugal head created by the front cover 40 with the slots 48 forces the piston 32 away from the friction material 34 enabling increased oil flow to exit between the friction material 34 and piston 32. The oil then passes into the slots 50 on the skirt 42 and its momentum is boosted as it moves axially with respect to the input shaft 12, with an Archimedes screw type force running at engine speed into the gap 66 between the turbine 26 and impeller 30. The oil is circulated in the turbine 26, stator 28 and impeller 30 to lubricate and cool the turbine 26, stator 28 and impeller 30 as well as to act as the medium of kinetic energy transfer.

Figure 8:
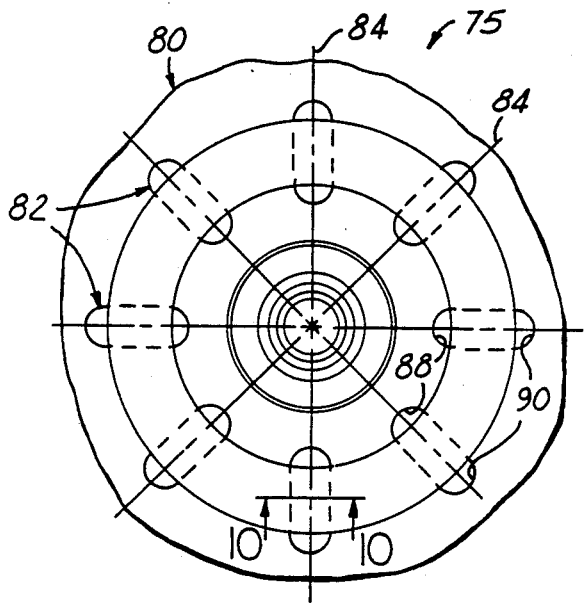
FIG. 8 is a fragmentary view of another embodiment of the present invention.
Figure 9:
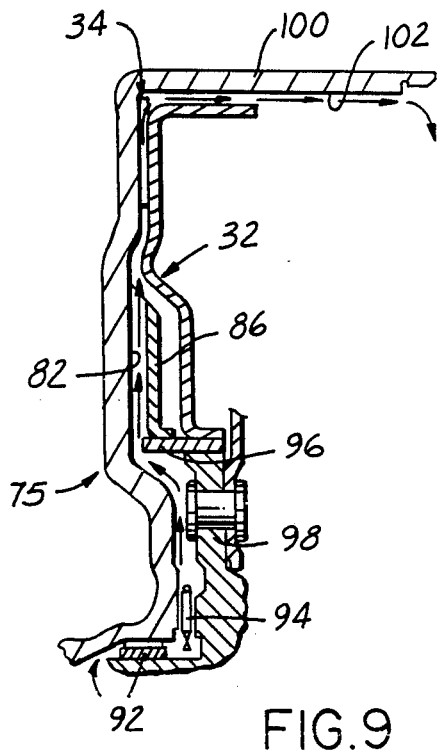
FIG. 9 is a fragmentary section view of the embodiment of FIG. 8 shown in operative relationship to other components of a larger converter.
Figure 10:
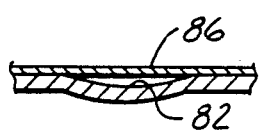
FIG. 10 is a section view of FIG. 8 the section being taken along line 10—10 thereof.

Moving to FIGS. 8 through 10, another embodiment of the present invention is shown. FIG. 8 illustrates a partial top plan view of a base 80 of a cover 75 in accordance with the present invention. The base 80, as well as the cover 75, is substantially similar to that previously explained, however, the slots 82 are different and will be explained herein.

The slots 82 are generally elongated and extend radially with respect to the center of the base 80. The slots 82 may be machined, stamped or the like into the base 80. The slots 82 are generally positioned such that the line 84 bisecting the slots 82 are equally spaced at a desired angular position about a 360 degree circle. In the present case, 8 slots are shown positioned such that the adjacent bisecting line 84 are at 45 degree angles with respect to one another. The slots 82 are generally capsule shape in plan and have a curved cross-section shape as illustrated in FIG. 10. A cover 86 is shown positioned in overlying relationship to the center body portion of the slots 82 leaving the opposite ends 88 and 90 of the slots 82 opened to pass oil through front cover 75 in a manner similar to that previously explained with respect to slots 48.

FIG. 9 illustrates a portion of the cover 75 in a cross-sectional view with a portion of the torque converter. The oil flow passes by the bushing 92, the bearing 94 and is deflected by a sleeve 96 on the turbine hub 98. The sleeve directs the oil flow into the slot 82 beneath the cover plate 86. The front cover 80 with the slots 82 in effect becomes a secondary impeller or centrifugal pump to counteract the centrifugal head on the turbine and piston 32 created by the leakage at the impeller-turbine annular tip clearance 99. The centrifugal head created by the front cover 80 with the slots 82 forces the piston 32 away from the friction material 34 enabling increased oil flow to exit between the friction material 34 and piston 32. The oil flow is then slung out of the slot 82 past the friction material 34 and the piston 32. If slots 50 are present on the skirt 100, the oil flow would pass into the skirt slots and up into the gap to lubricate and cool the turbine, stator and impeller as previously described. If slots 50 are not present, the fluid would climb the smooth interior surface 102 of the skirt 100 and at a decreased rate pass into the annular gap 99 to lubricate and cool the turbine, stator and impeller as previously described.

EXAMPLE I

Figure 1:
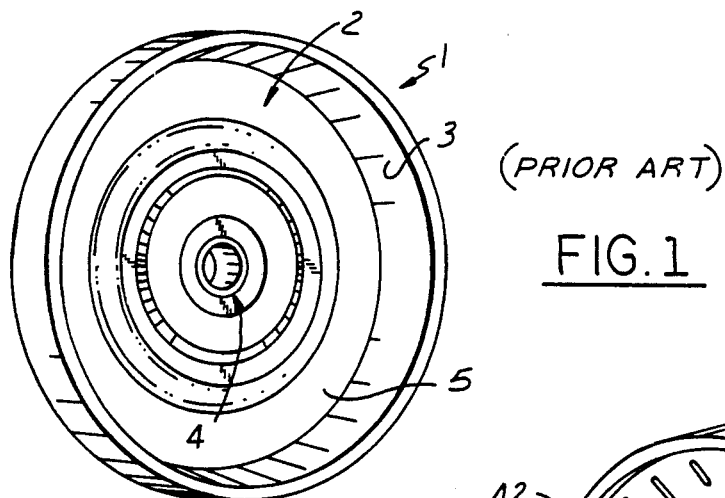
FIG. 1 illustrates a perspective view of an existing torque converter housing.

A cover like that of FIG. 1 was assembled on a torque converter for testing on a dynamometer. Oil flow at a dead stop through the torque converter was 4.70 g.p.m. The temperature of the oil inside the converter was 188° F. The pressure of the oil going into the torque converter was 80 PSI and the exit pressure was 30 PSI. Testing of the torque converter at stall conditions were conducted on the dynamometer. The dynamometer torque was 100 ft. lb.; the input RPM was 2553; the stall torque ratio was 1.94; the oil temperature into the torque converter was 279° F., the exit temperature was 128° F., the oil pressure into the torque converter was 82 PSI, the exit pressure 28 PSI; and at the above parameters the oil flow through the torque converter was 1.64 g.p.m.

EXAMPLE II

A second test using the same cover as in Example I was conducted with the following results:

Testing of the torque converter at stall conditions were conducted on the dynamometer. The dynamometer torque was 100 ft. lb.; the input RPM was 2549; the stall torque ratio was 1.94; the oil temperature into the torque converter was 281° F., the exit temperature was 128° F.; the oil pressure into the torque converter was 82 PSI, the exit pressure 28 PSI; and at the above parameters the oil flow through the torque converter was 1.90 g.p.m.

EXAMPLE III

A cover in accordance with the present invention, like that illustrated in FIGS. 2-7 was assemble on a torque converter for testing on a dynamometer. Oil flow at a dead stop through the torque converter was 4.97 g.p.m. The temperature of the oil inside the converter was 195° F. The pressure of the oil going into the torque converter was 80 PSI and the exit pressure was 30 PSI. Testing of the torque converter at stall conditions were conducted on the dynamometer. The dynamometer torque was 100 ft. lb.; the input RPM was 2503; the stall torque ratio was 1.926; the oil temperature into the torque converter was 266° F., the exit temperature was 138° F.; the oil pressure into the torque converter was 81 PSI, the exit pressure 31 PSI; and at the above parameters the oil flow through the torque converter was 2.86 g.p.m.

While the above detailed description describes the preferred embodiment of the present invention, it will be understood that the present invention is susceptible to modification, alteration, and variation without deviating from the scope and fair meaning of the subjoined claims.

What is claimed is:

1. A housing cover for a torque converter comprising:
   a base having a cup means adapted for accepting fluid entering into said housing;
   a continuous wall surrounding said base and extending substantially transverse from said base; and
   means for increasing fluid flow in the torque converter, said flow increasing means being formed on one of said housing base and said wall.

2. A housing cover according to claim 1 wherein said means for increasing fluid flow includes one or more slots radially formed in said base.

3. A housing cover according to claim 2 wherein said one or more slots are positioned at predetermined positions with respect to said base such that fluid flow is maximized as fluid passes through said one or more slots.

4. A housing cover according to claim 3 wherein at least eight slots are formed in said base for increasing fluid flow in the torque converter.

5. A housing cover according to claim 1 wherein said means for increasing fluid flow includes one or more arcuate slots formed in said wall.

6. A housing cover according to claim 1 wherein said one or more slots are positioned at desired acute angles with respect to the lateral edges of said wall such that fluid flow is maximized as fluid passes through said one or more slots.

7. A housing cover according to claim 3 wherein said means for increasing fluid flow includes one or more arcuate slots formed in said wall.

8. A housing cover according to claim 7 wherein said one or more arcuate slots are positioned at desired acute angles with respect to the lateral edge of said wall such that fluid flow is maximized as fluid passes through said one or more slots.

9. A torque converter housing cover comprising:
   a substantially circular base having a cup at its center and a radial portion having a contoured interior surface;
   an annular skirt transversely extending from the periphery of said base; and
   a plurality of grooves in one of said base and said skirt adapted for increasing fluid flow within the torque converter.

10. A torque converter housing cover according to claim 9 wherein said plurality of grooves are formed radially in said contoured interior surface of said base.

11. The torque converter housing cover according to claim 10 wherein said plurality of grooves are at desired positions with respect to said base center such that fluid flow is maximized as fluid passes through said one or more grooves.

12. The torque converter housing cover according to claim 11 wherein at least eight grooves are formed in said base for increasing fluid flow in the torque converter.

13. The torque converter housing cover according to claim 9 wherein said plurality of grooves for increasing fluid flow include one or more arcuate grooves formed in said skirt.

14. The torque converter housing cover according to claim 13 wherein said one or more arcuate grooves are positioned at desired acute angles with respect to the lateral edge of said skirt such that fluid flow is maximized as fluid passes through said one or more grooves.

15. The torque converter housing cover according to claim 11 wherein said means for increasing fluid flow include one or more curvilinear grooves formed in said skirt.

16. The torque converter housing cover according to claim 15 wherein said one or more arcuate grooves are positioned at desired acute angles with respect to the lateral edge of said skirt such that fluid flow is maximized as fluid is moved through said one or more grooves.

17. The torque converter housing cover according to claim 9 further comprising an annular cover adapted for positioning in overlying relationship to said plurality of grooves such that a substantial portion of each of said grooves is concealed.

* * * * *

UNITED STATES PATENT AND TRADEMARK OFFICE
CERTIFICATE OF CORRECTION

PATENT NO. : 4,951,467
DATED : August 28, 1990
INVENTOR(S) : Walsh et al

It is certified that error appears in the above-identified patent and that said Letters Patent is hereby corrected as shown below:

Column 2, line 63 delete "axially" and insert --radially--.

Column 3, line 66, delete "of" and insert --acting against--.

Column 5, line 12, delete "into" and insert --out of--;
          line 13, delete "exit" and insert --inlet--;
          line 25, delete "into" and insert --out of--;
          line 26, delete "exit and insert --inlet;
          line 36, delete "inside" and insert --into--;
          line 43, delete "into" and insert --out of--;

Signed and Sealed this

Seventh Day of April, 1992

Attest:

HARRY F. MANBECK, JR.

*Attesting Officer*      *Commissioner of Patents and Trademarks*